United States Patent
Deshpande

(10) Patent No.: US 10,138,327 B2
(45) Date of Patent: Nov. 27, 2018

(54) THERMOPLASTIC POLYMERS COMPRISING OXYGEN SCAVENGING MOLECULES

(71) Applicant: Girish N. Deshpande, Morris Plains, NJ (US)

(72) Inventor: Girish N. Deshpande, Morris Plains, NJ (US)

(73) Assignee: Plastipak Packaging, Inc., Plymouth, MI (US)

( * ) Notice: Subject to any disclaimer, the term of this patent is extended or adjusted under 35 U.S.C. 154(b) by 0 days.

(21) Appl. No.: 14/585,413

(22) Filed: Dec. 30, 2014

(65) Prior Publication Data

US 2016/0376404 A1 Dec. 29, 2016

Related U.S. Application Data

(60) Continuation of application No. 14/258,823, filed on Apr. 22, 2014, now Pat. No. 8,975,345, which is a division of application No. 12/945,353, filed on Nov. 12, 2010, now Pat. No. 8,748,519.

(60) Provisional application No. 61/261,209, filed on Nov. 13, 2009.

(51) Int. Cl.

| C08G 63/91 | (2006.01) |
|---|---|
| C08G 63/685 | (2006.01) |
| C08G 73/10 | (2006.01) |
| C08G 73/12 | (2006.01) |
| C08L 79/08 | (2006.01) |
| C08G 73/06 | (2006.01) |
| C08K 5/00 | (2006.01) |
| C08K 3/013 | (2018.01) |

(52) U.S. Cl.
CPC ......... *C08G 63/91* (2013.01); *C08G 63/6856* (2013.01); *C08G 63/916* (2013.01); *C08G 73/0672* (2013.01); *C08G 73/10* (2013.01); *C08G 73/12* (2013.01); *C08K 3/013* (2018.01); *C08K 5/0041* (2013.01); *C08L 79/08* (2013.01); *Y10T 428/1352* (2015.01)

(58) Field of Classification Search
CPC .... C08G 73/0672; C08G 73/10; C08G 73/12; C08G 63/6856; C08G 63/916; C08L 79/08; Y10T 428/1352
See application file for complete search history.

(56) References Cited

U.S. PATENT DOCUMENTS

| 8,748,519 B2 * | 6/2014 | Deshpande ........ C08G 63/6856 524/104 |
|---|---|---|
| 2003/0109643 A1 * | 6/2003 | Ching ...................... C08F 8/00 525/328.2 |

* cited by examiner

*Primary Examiner* — Robert S Jones
(74) *Attorney, Agent, or Firm* — Ballard Spahr LLP

(57) ABSTRACT

The disclosure relates to oxygen scavenging polymer compositions, methods of making the compositions, articles prepared from the compositions, and methods of making the articles. This abstract is intended as a scanning tool for purposes of searching in the particular art and is not intended to be limiting of the present invention.

4 Claims, 1 Drawing Sheet

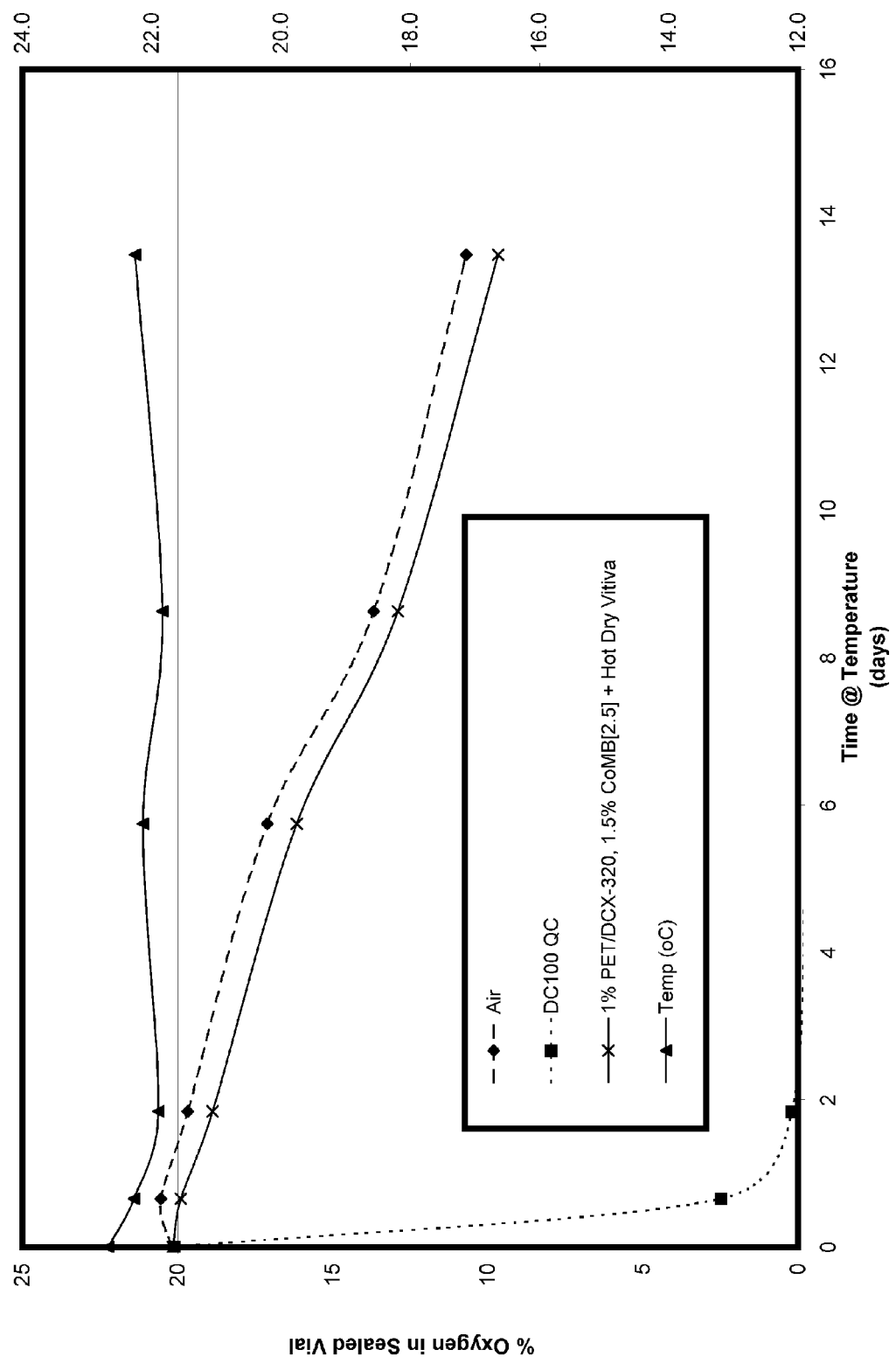

THERMOPLASTIC POLYMERS COMPRISING OXYGEN SCAVENGING MOLECULES

CROSS-REFERENCE TO RELATED APPLICATIONS

This application is a continuation of co-pending U.S. application Ser. No. 14/258,823 filed Apr. 22, 2014, which claims the benefit of and priority to U.S. application Ser. No. 12/945,353 filed Nov. 12, 2010, now U.S. Pat. No. 8,748,519, which claims the benefit of and priority to U.S. Provisional Patent Application No. 61/261,209 filed Nov. 13, 2009, the entire disclosures of which are incorporated by reference herein.

BACKGROUND

Many polymers used in packaging materials and other articles are permeable to oxygen. When oxygen permeates a polymeric composition or article, it can cause oxidative damage to the contents of the package. It is therefore desirable for certain polymer compositions and articles to have oxygen scavenging capability, such that when oxygen permeates the composition or article, oxidative damage can be mitigated.

It is known in the art to include an oxygen scavenger in the packaging structure for the protection of oxygen sensitive materials. Such scavengers are believed to react with oxygen that is trapped in the package or that permeates from outside of the package, thus extending to life of package contents. These packages include films, bottles, containers, and the like. Food, beverages (such as beer and fruit juices), cosmetics, medicines, and the like are particularly sensitive to oxygen exposure and require high barrier properties to oxygen to preserve the freshness of the package contents and avoid changes in flavor, texture and color.

Conventional polymeric materials suffer from a lack of oxygen scavenging moieties in the polymeric structures. In various aspects, the disclosed compositions provide for this need as well as other needs.

SUMMARY

In accordance with the purpose(s) of the invention, as embodied and broadly described herein, the invention, in one aspect, relates to oxygen scavenging polymers.

Disclosed are thermoplastic polymers comprising an allylic or benzylic amide compound covalently bonded thereto as a repeating unit in the polymer chain, covalently bonded thereto as a pendant group, or covalently bonded thereto as an end group of the polymer.

Also disclosed are compositions comprising the disclosed polymers.

Also disclosed are articles prepared from the disclosed polymers and compositions.

Also disclosed are methods of making oxygen scavenging polymers.

Also disclosed are the products of the disclosed methods.

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

FIG. 1 is a plot illustrating oxygen scavenging ability of a the polymer composition prepared according to Example 2.

DETAILED DESCRIPTION

The present invention can be understood more readily by reference to the following detailed description of the invention and the Examples included therein.

Before the present compounds, compositions, articles, systems, devices, and/or methods are disclosed and described, it is to be understood that they are not limited to specific synthetic methods unless otherwise specified, or to particular reagents unless otherwise specified, as such may, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds can not be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including steps in methods of making and using the compositions of the invention. Thus, if there are a variety of additional steps that can be performed it is understood that each of these additional steps can be performed with any specific embodiment or combination of embodiments of the methods of the invention.

As used in the specification and the appended claims, the singular forms "a," "an" and "the" include plural referents unless the context clearly dictates otherwise. Thus, for example, reference to "a functional group," "an alkyl," or "a residue" includes mixtures of two or more such functional groups, alkyls, or residues, and the like.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

Disclosed herein are thermoplastic polymers having covalently linked thereto a benzylic or allylic amide compound which can function as an oxygen scavenger in a polymeric composition. A variety of different thermoplastic polymers can be used. Generally, polymers that exhibit at least some oxygen permeability can be used, at least inasmuch as the disclosed compositions can reduce the oxidative damage to the polymer. The polymer can be a polymer commonly used in packaging materials including most thermoplastic polymers, including polyethylene, such as low density polyethylene, very low density polyethylene, ultra-low density polyethylene, high density polyethylene, linear low density polyethylene, and polypropylene; polyesters such as (PET), (PEN) and their copolymers such as PET/IP; polyvinyl chloride (PVC); polyvinylidene chloride (PVDC); and ethylene copolymers such as ethylene/vinyl acetate copolymer, ethylene/alkyl (meth)acrylate copolymers, ethylene/(meth) acrylic acid copolymers, and ionomers. Blends of different base polymers also can be used. In a further aspect, the polymer comprises a polyester polymer or copolymer. Preferred polyesters include polymers of phthalic acids, such as polyethylene terephthalate (PET), or a copolymer thereof.

Generally, the benzylic or allylic amide compound is attached to the polymer through one or more polymer end groups or is actually part of the polymer backbone itself. In a first aspect, the polymer is a polyester or copolyester having covalently attached thereto a benzylic or allylic amide compound. Generally, the amide compound that is covalently attached to the polymer is an N-allylic amide compound or N-benzylic amide compound. The amide compound is useful as an oxygen scavenger in the composition. The oxygen scavenging ability of the amide compound can be enhanced by the transition metal.

N-allylic or N-benzylic amide compounds have the general structure shown below:

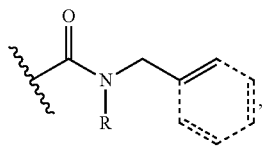

wherein each --- independently denotes an optional covalent bond.

It is also appreciated that an N-allylic or N-benzylic amide compound can be further substituted and that more than one amide functionality can be present in a compound. In one aspect, an N-allylic or N-benzylic amide compound can be polymeric. In a further aspect, an N-allylic or N-benzylic amide compound can be nonpolymeric.

The benzylic amide compound or allylic amide compound can have a variety of functional groups that will enable the compound to be attached to the polymer through an endgroup of the polymer or through the polymer backbone itself.

In one aspect, the amide compound has a structure of Formula I or II:

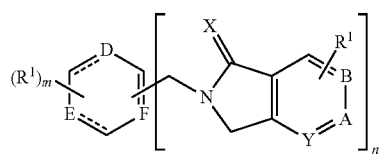

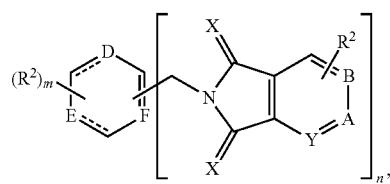

wherein the symbol --- when used in conjunction with a bond line represents a single or a double bond; wherein n is 3, 4, 5, or 6; wherein m is an integer from 0 to 6-n; wherein each X is independently selected from the group consisting of O, S, and NH; wherein each Y, each A, and each B are independently selected from the group consisting of N, $CR^1$, and $CR^2$; wherein D, E, and F are independently selected from the group consisting of CH, N, O, and S; and wherein each $R^1$ and each $R^2$ is independently selected from the group consisting of carboxylic acid, amine, nitro, cyano, hydroxyl, H, alkyl, aryl, electron withdrawing groups, electron releasing groups, and a transition metal.

In one aspect, the compound of formula I or II can be represented by the following formula:

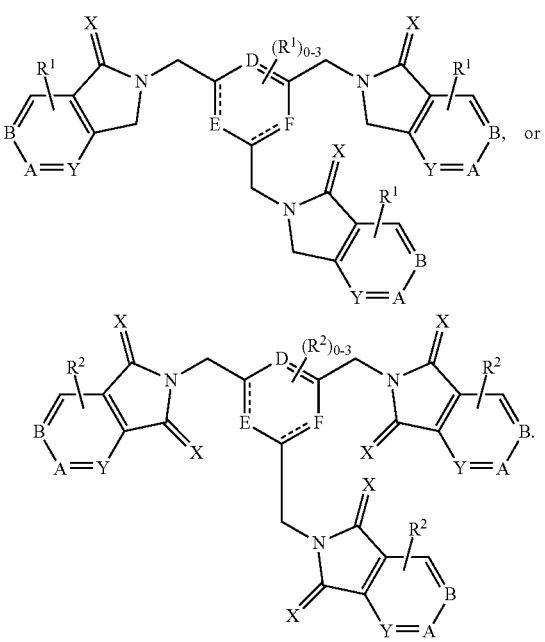

In a further aspect, the compound has a structure of Formula III or Formula IV:

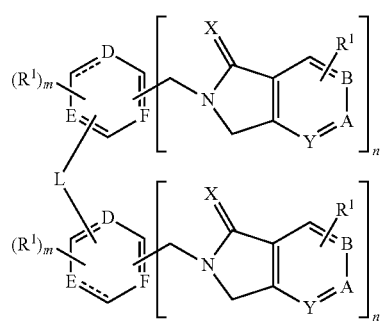

-continued

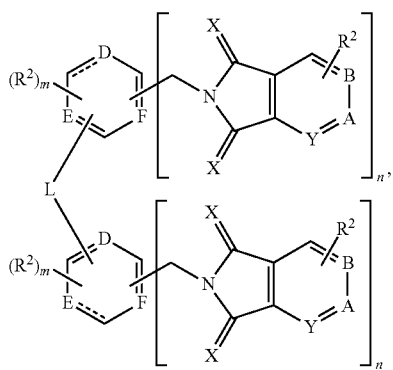

(IV)

wherein the symbol --- when used in conjunction with a bond line represents a single or a double bond; wherein each n is independently 1-5; wherein m is an integer from 0 to 5-n; wherein each X is independently selected from the group consisting of O, S, and NH; wherein each Y, each A, and each B are independently selected from the group consisting of N, CR$^1$, and CR$^2$; wherein D, E, and F are independently selected from the group consisting of CH, N, O, and S; wherein each R$^1$ and each R$^2$ is independently selected from the group consisting of carboxylic acid, amine, nitro, cyano, hydroxyl, H, alkyl, aryl, electron withdrawing groups, electron releasing groups, and a transition metal; and wherein L is a divalent linking group selected from C2-C12 aliphatic or cyclic ether, C2-C12 aliphatic or cyclic amide, C6 to C12 aromatic amide, C2-C12 aliphatic or cyclic amine, C6-C12 aromatic amine, C2-C12 aliphatic or cyclic ester and C6 to C12 aromatic ester.

In a further aspect, the compound has a structure of Formula V or Formula VI:

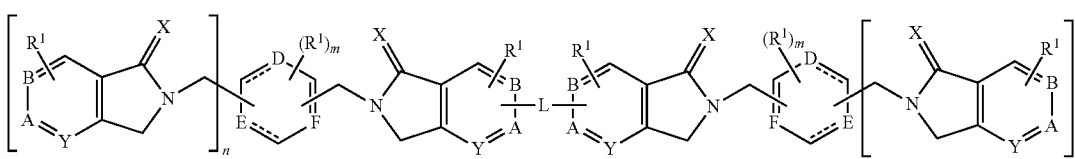

(V)

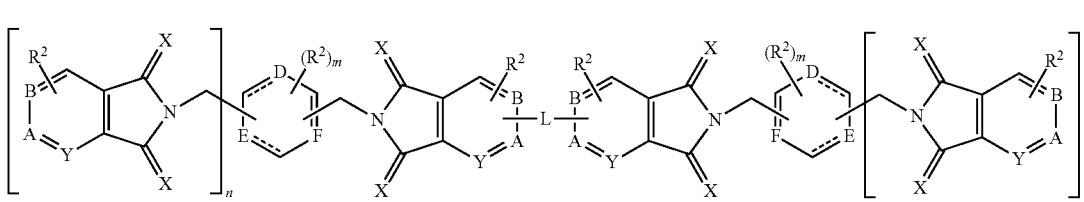

(VI)

wherein the symbol --- when used in conjunction with a bond line represents a single or a double bond; wherein each n is independently 0-5; wherein m is an integer from 0 to 5-n; wherein each X is independently selected from the group consisting of O, S, and NH; wherein each Y, each A, and each B are independently selected from the group consisting of N, CR$^1$, and CR$^2$; wherein D, E, and F are independently selected from the group consisting of CH, N, O, and S; wherein each R$^1$ and each R$^2$ is independently selected from the group consisting of carboxylic acid, amine, nitro, cyano, hydroxyl, H, alkyl, aryl, electron withdrawing groups, electron releasing groups, and a transition metal; and wherein L is a divalent linking group selected from C2-C12 aliphatic or cyclic ether, C2-C12 aliphatic or cyclic amide, C6 to C12 aromatic amide, C2-C12 aliphatic or cyclic amine, C6-C12 aromatic amine, C2-C12 aliphatic or cyclic ester and C6 to C12 aromatic ester.

Generally, linking group L is a divalent organic residue. Suitable linking groups L include divalent aliphatic chains, divalent aliphatic or cyclic ethers, divalent aliphatic or cyclic amides, divalent aromatic amide, divalent aliphatic or cyclic amines, divalent aromatic amines, divalent aliphatic or cyclic esters and divalent aromatic esters, such as those exemplified in Table 1 below. As used in the table below, the term "tether compound" refers to a difunctional organic compound capable of reactions with ring substituents of disclosed moieties to form covalent bonds, thereby chemically connecting the ring substitutents via a divalent organic residue of the tether compound, referred to as a linking group, L. Examples of tether compounds include dielectrophilic compounds (e.g., diacyl halides, cyclic anhydrides, and bis-alkyl halides) for linking nucleophilic ring substituents (e.g., hydroxides, thiols, and amines). Further examples of tether compounds include dinucleophilic compounds (e.g., bis-hydroxides, bis-thiols, and bis-amines) for linking electrophilic ring substituents (e.g., acyl halides and alkyl halides). Selected examples are illustrated structurally in Table 1.

TABLE 1

| L | Ring Substituent | Tether Compound |
|---|---|---|
| (structure) | (structure) | (structure) |
| (structure) | (structure) | wherein Z is OH, OR', halogen, or psuedohalogen; or |

TABLE 1-continued

| L | Ring Substituent | Tether Compound |
|---|---|---|
| (structure) | (structure) | (structure) |

TABLE 1-continued

| L | Ring Substituent | Tether Compound |
|---|---|---|
| (structure) | (structure) Z, wherein Z is OH, OR', halogen, or psuedohalogen. | H-O-R-O-H<br>H-S-R-S-H<br>(structure with R'NH-R-NHR') |
| (structure) | | Z-R-Z, wherein each Z is OH, OR', halogen, or psuedohalogen. |
| (structure) | (structure)-H | |
| (structure) | (structure)-H | |
| (structure) | (structure)-Z | HO-R-OH |
| (structure) | | HS-R-SH |
| (structure) | | HN(R')-R-NH(R') |

In Table 1 above, R is an optionally substituted divalent organic residue; for example, R can be selected from optionally substituted alkyl or alkenyl or alkynyl, optionally substituted heteroalkyl or heteroalkenyl or heteroalkynyl, optionally substituted cycloalkyl or cycloalkenyl or cycloalkynyl, optionally substituted heterocycloalkyl or heterocycloalkenyl or heterocycloalkynyl, optionally substituted aryl, and optionally substituted heteroaryl. In further aspects, R can be linear, cyclic, or branched. Typically, R has from 1 to 48 carbons, from 1 to 24 carbons, from 1 to 12 carbons, from 1 to 8 carbons, from 1 to 6 carbon, or from 1 to 4 carbons.

In further aspects, R' is an optionally substituted organic residue. Typically, R' has from 1 to 12 carbons, from 1 to 8 carbons, from 1 to 6 carbon, or from 1 to 4 carbons. For example, R' can be methyl, ethyl, propyl, butyl, pentyl, or hexyl.

It is also contemplated that the functional groups selected for use in fabricating L can be used in combinations other than those shown in the Table. For example, in a further aspect, L can be:

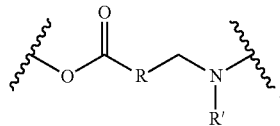

Linking groups L can be readily prepared by methods known to those of skill in the art of organic synthesis.

In one aspect, the amide compound has a structure of Formula VII:

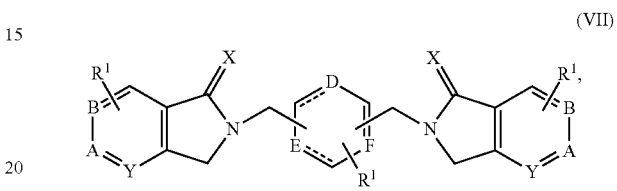

(VII)

wherein each X is selected from the group consisting of O, S, and NH; wherein each Y, each A, and each B are independently selected from the group consisting of N and $CR^1$; wherein D, E, and F are independently selected from the group consisting of CH, N, O, and S; wherein the symbol --- when used in conjunction with a bond line represents a single or a double bond; and wherein each $R^1$ is independently selected from the group consisting of H, alkyl, aryl, electron withdrawing groups, and electron releasing groups.

In a further aspect, the amide compound has a structure of Formula VIII:

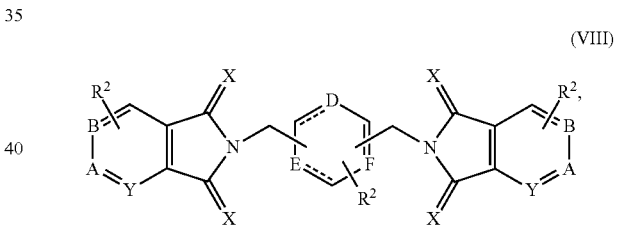

(VIII)

wherein each X is selected from the group consisting of O, S, and NH; wherein each Y, each A, and each B are independently selected from the group consisting of N and $CR^2$; wherein D, E, and F are independently selected from the group consisting of CH, N, O, and S; wherein the symbol --- when used in conjunction with a bond line represents a single or a double bond; and wherein each $R^2$ is independently selected from the group consisting of H, alkyl, aryl, electron withdrawing groups, and electron releasing groups.

The alkyl groups R1 or R2 of the compound of Formulae (I-VIII) can be a branched or unbranched saturated hydrocarbon group of 1 to 24 carbon atoms, e.g. 1 to 18 carbons atoms, 1 to 14 carbon atoms, 1 to 12 carbon atoms, 1 to 10 carbon atoms, 1 to 8, 1 to 6 carbon atoms, or 1 to 4 carbon atoms, such as methyl, ethyl, n-propyl, isopropyl, n-butyl, isobutyl, t-butyl, pentyl, hexyl, heptyl, octyl, decyl, tetradecyl, hexadecyl, eicosyl, tetracosyl and the like. The alkyl group can be substituted or unsubstituted. The alkyl group can be substituted with one or more groups including, but not limited to, alkyl, halogenated alkyl, alkoxy, alkenyl, alkynyl, aryl, heteroaryl, aldehyde, amino, carboxylic acid, ester, halide, hydroxamate, hydroxy, ketone, nitro, silyl, sulfo-oxo, sulfonyl, sulfone, sulfoxide, or thiol, as described below. The alkyl group can be halogenated, which includes an alkyl group that is substituted with one or more halide, e.g., fluorine, chlorine, bromine, or iodine. The alkyl group can also be a lower alkyl group, which is an alkyl group containing from one to six (e.g., from one to four) carbon atoms.

The aryl groups R1 or R2 of the compound of Formulae (I-VIII) can be any carbon-based aromatic group including but not limited to, benzene, naphthalene, phenyl, biphenyl, etc. The aryl group can also be heteroaryl, which is defined as an aromatic group that has at least one heteroatom incorporated within the ring of the aromatic group. Examples of heteroatoms include, but are not limited to, nitrogen, oxygen, sulfur, and phosphorus. The aryl group can be substituted or unsubstituted. The aryl group can be substituted with one or more groups including, but not limited to, alkyl, halogenated alkyl, alkoxy, alkenyl, alkynyl, aryl, heteroaryl, aldehyde, amino, carboxylic acid, ester, halide, hydroxamate, hydroxy, ketone, nitro, silyl, sulfo-oxo, sulfonyl, sulfone, sulfoxide, or thiol as described herein. A biaryl group is a specific type of aryl group and is included in the definition of aryl. Biaryl refers to two aryl groups that are bound together via a fused ring structure, as in naphthalene, or are attached via one or more carbon-carbon bonds, as in biphenyl.

Suitable electron withdrawing groups and electron releasing groups are generally known in the art. Preferred electron withdrawing groups include nitro, carboxylic acid, esters, for example loweralkyl esters, and cyano. Preferred electron releasing groups include branched and straight chain alkyl groups, for example, methyl, ethyl, propyl, isopropyl, butyl, isobutyl, and tert-butyl. Other preferred electron releasing groups include alkoxy, for example methoxy and ethoxy. Other preferred electron releasing groups include thioalkyl.

Still other preferred electron releasing groups include amines, for example —$NH_2$, and NH(loweralkyl), and N(loweralkyl)$_2$.

Oxygen scavenging amide compounds are disclosed in U.S. Patent Application Publication No. 20080277622, Deshpande et al. "Oxygen Scavenging Molecules, Articles Containing Same, And Methods of Their Use," which is incorporated herein by this reference for its teaching of amide compounds, their preparation, and their use as oxygen scavenging materials. Many of the amide compounds disclosed in U.S. Patent Application Publication No. 20080277622 can be covalently attached to the end of a polymer, such as a PET polyester, or actually copolymerized with a polymer and thereby be incorporated into the polymer backbone itself.

The compound of Formulae (I-VIII) can be attached to a thermoplastic polymer through any atom and can be attached as a side-chain, end group, or as a repeating unit in the polymer backbone itself. In one aspect, amide compounds of the formulae above can be attached to a polymer, such as a polyester, through an endgroup of the polyester. Typically, this can be accomplished by reacting one of the functional groups of the amide compound, for example one or more of $R^1$ or $R^2$ groups, with the alcohol, carboxylic acid, or ester end group of the polyester. The compounds above can also be copolymerized with one or more polyester monomers, for example, if the amide compound comprises two carboxylic acid or alcohol functional groups at either end of the molecule.

To provide specific illustrations of the polymers and how to make the polymers, the following non-limiting examples are provided. As discussed above, a PET polymer can be functionalized at one or more endgroups with a benzylic amide according to Scheme 1. It will be appreciated that such a synthetic approach can be used for a variety of different benzylic or allylic amide compounds.

Scheme 1.

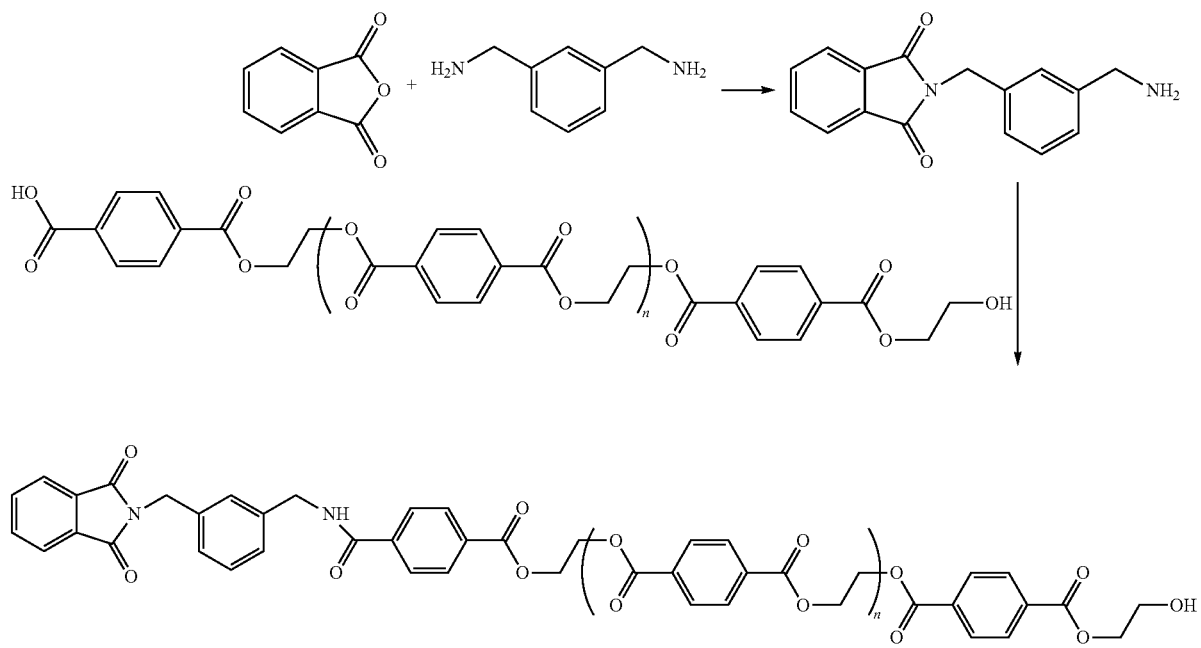

According to Scheme 1, a benzylic amide compound can be prepared according to method analogous to those disclosed in U.S. Patent Application Publication No. 20080277622, discussed above. Subsequently the benzylic amide can be functionalized to a PET polymer through the carboxy terminus through a typical coupling reaction, such as a peptide coupling reaction, employing for example, a carbodiimide and a base. The resulting polymer therefore has a benzylic amide compound at its endgroup which can function as an internal oxygen scavenger in a composition comprising the polymer.

Another example of this approach is outlined in Scheme 2, wherein a different benzylic amide compound can be attached to the endgroup of a PET polymer. In this case, the amide compound is again functionalized to the PET through its carboxy terminus. The resulting polymer can be attached to yet another PET polymer through the carboxy end of the benzylic amide compound. Such a strategy can be useful, for example, when trying to alter the molecular weight of the PET polymer.

Scheme 2.

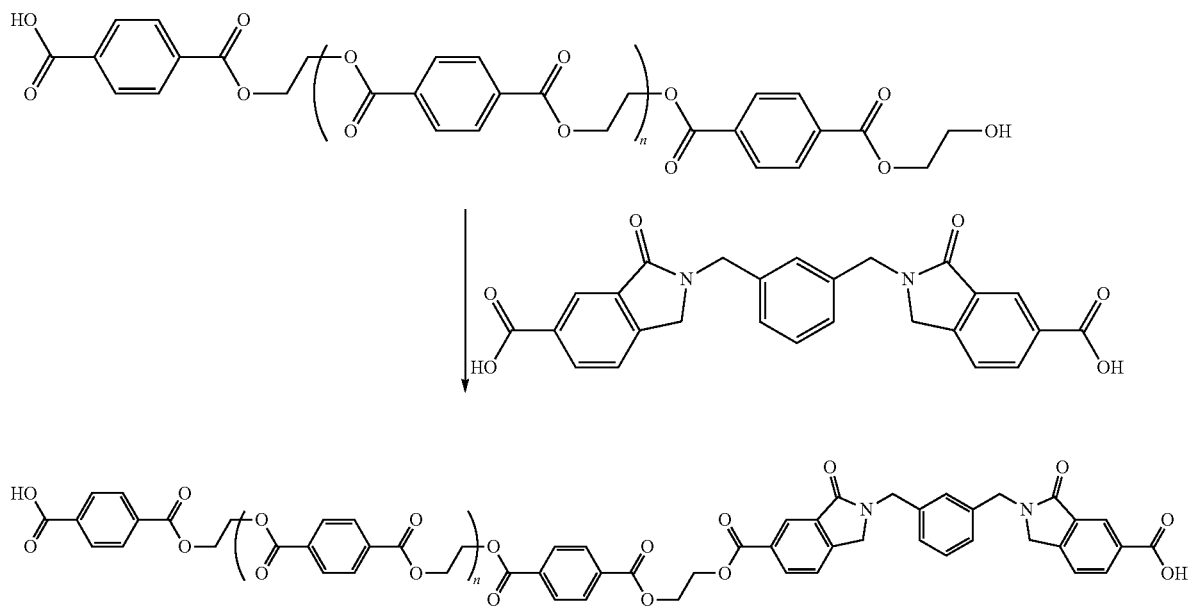

In another aspect, as discussed above, the benzylic or allylic amide compound can be incorporated into the polymer backbone itself. Such a polymer can be made, for example, according to Scheme 3. As shown, terephthalic acid, ethylene glycol, and a benzylic amide compound can be copolymerized under typical conditions for preparing polyesters.

Scheme 3.

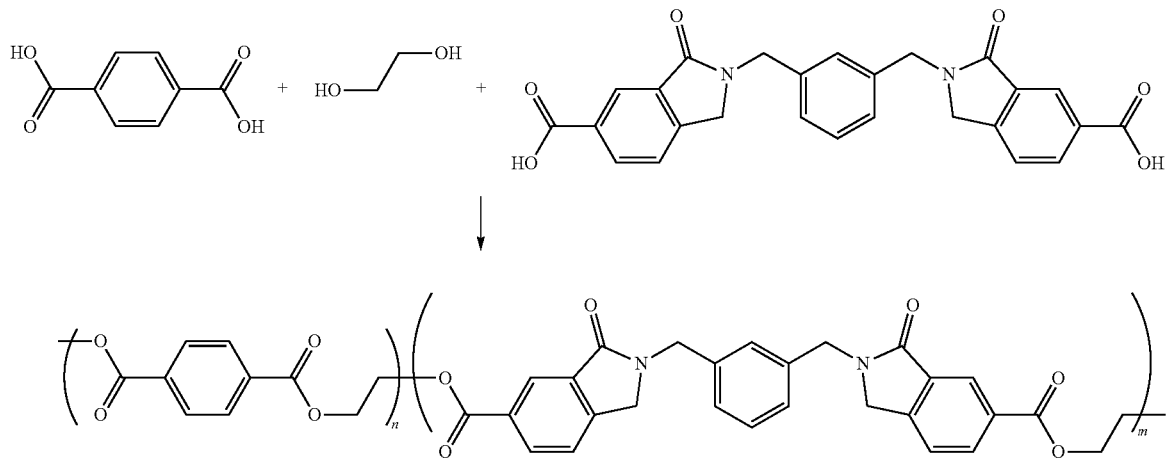

In another example, a star type polymer can be produced using a trimeric or higher or benzylic or allylic amide compound. For example, as shown in Scheme 4, terephthalic acid can be copolymerized with ethylene glycol and a trimeric benzylic amide compound having three carboxylic acid groups. The resulting polymer will be a branched, star-type polymer as shown.

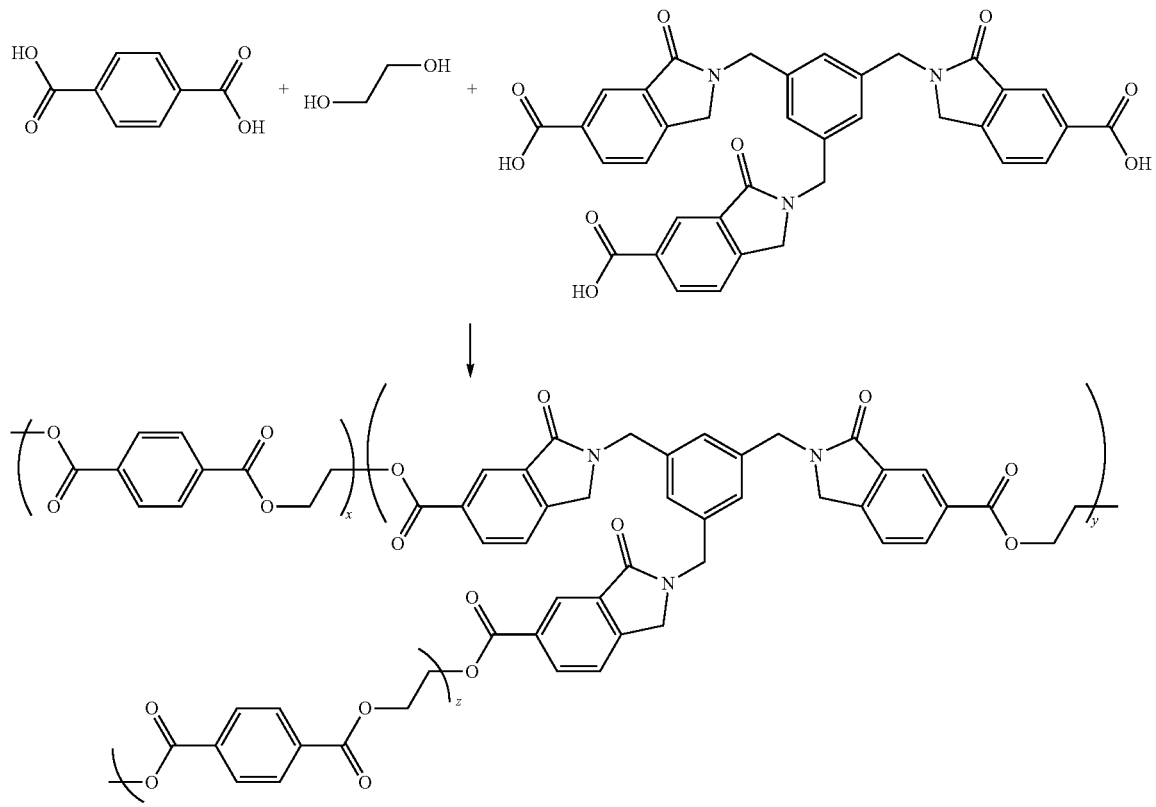

Scheme 4.

Polyesters such as PET can be prepared by polymerization procedures known in the art sufficient to effect esterification and polycondensation. Polyester melt phase manufacturing processes include direct condensation of a dicarboxylic acid with a diol, optionally in the presence of one or more esterification catalysts, in the esterification zone, followed by polycondensation in the prepolymer and finishing zones in the presence of a polycondensation catalyst; or ester exchange usually in the presence of a transesterification catalyst in the ester exchange zone, followed by prepolymerization and polymerization in the presence of a polycondensation catalyst.

Also disclosed are compositions and articles made therefrom comprising the polymer having the benzylic amide or allylic amide compound covalently bonded thereto. Generally, the amide compound is present in the composition in an amount of from 0.1 to about 10 weight percent. Thus, the desired amount of amide compound to be incorporated into the polymer can be adjusted to achieve the desired amide compound weight percent in the final composition or article. In one aspect, the amide compound is present in the composition in an amount of from 1 to about 10 weight percent. In a further aspect, the amide compound is present in the composition in an amount of from 1 to about 5 weight percent. In a further aspect, the amide compound is present in the composition in an amount of from 1 to about 3 weight percent.

The amide compound can in certain aspects be complexed to the transition metal of the composition. For example, the amide compound can be complexed to the transition metal through one or more aryl groups, for example through pi-cloud complexation. The amide compound can also be polymerized via complexation to the transition metal.

The composition comprises the transition metal in a positive oxidation state. The transition metal enhances the oxygen scavenging properties of the amide compound. Amounts of transition metal in the composition can be greater than zero and can be up to 5000 ppm. Generally, the transition metal will be present in an amount of from about 10 ppm to about 400 ppm. In one aspect, about 200 ppm of the transition metal is present. In a further aspect, about 250 ppm of the transition metal is present. In wall applications (as opposed to master batch applications where more transition metal is used), it can be preferred to keep the level of metal below 300, more preferably 250 ppm. In a further aspect, the transition metal is present from 30 to 150 ppm. In a further aspect, about 50 ppm of the transition metal is present. In a further aspect, about 100 ppm of the transition metal is present. In a further aspect, about 150 ppm of the transition metal is present.

In one aspect, the transition metal can be a transition metal from the first, second, or third transition series of the Periodic Table. The metal can be Rh, Ru, or one of the elements in the series of Sc to Zn (e.g., Sc, Ti, V, Cr, Mn, Fe, Co, Ni, Cu, and Zn). In one aspect, the transition metal is cobalt. Cobalt can be used in +2 or +3 oxidation states. In some aspects, it is preferred to use cobalt in the +2 oxidation state. In a further aspect, the transition metal is rhodium. For example, rhodium in the +2 oxidation state can be used. The transition metal can also be a positive oxidation form of zinc.

The transition metal can be present as a salt. The cation of the salt can be the transition metal in a positive oxidation state. A variety of anions can stabilize the positively charged transition metal. Suitable anions for the salts include, but are not limited to, chloride, acetate, oleate, stearate, palmitate, 2-ethylhexanoate, carboxylates, such as neodecanoates, octanoates, acetates, lactates, naphthalates, malates, stearates, acetylacetonates, linoleates, oleates, palmitates, 2-ethylhexanoates, or ethylene glycolates; or as their oxides, borates, carbonates, dioxides, hydroxides, nitrates, phosphates, sulfates, or silicates, among others. Representative transition metal salts include cobalt (II) 2-ethylhexanoate, cobalt oleate, and cobalt (II) neodecanoate. The transition metal salt also can be an ionomer, in which case a polymeric counter ion can be present.

In one aspect, the composition can comprise a colorant in a visually effective amount. A visually effective amount refers to an amount of colorant that results in the composition or an article made therefrom appear colored to the naked eye. A composition comprising a visually effective amount of colorant can refer to a composition having at least 0.01% by weight colorant. In a further aspect, the composition can comprise at least 0.25% by weight colorant. In a still further aspect, the composition can comprise at least 0.5% by weight colorant. The compositions can also comprise up to or even exceed about 3% by weight colorant.

A visually effective amount can be determined, for example, by performing a spectrophotometric scan of the composition or article using a wavelength range from 400 to 700 nm (visible region). Specific colors can be characterized according to their spectral pattern. Every color also has its own characteristic L (lightness gradation), a (red to green) and b (yellow to blue) numbers, which can be used to characterize the compositions and articles.

The colorant can be a variety of pigments and dyes, many of which are commercially available. Examples of colorants include without limitation COLORMATRIX Dark Amber, product code: 189-10034-6, COLORMATRIX Dead Leaf Green, product codes: 284-2801-3 and 84-2801-1, AMERICHEM amber, product code: 59108-CD1, Champaigne green, and COLORMATRIX amber, product code: 189-10100-1.

The composition can include other components such as fillers, crystallization aids, impact modifiers, surface lubricants, denesting agents, stabilizers, ultraviolet light absorbing agents, metal deactivators, nucleating agents such as polyethylene and polypropylene, phosphate stabilizers and dyestuffs. Typically, the total quantity of such components will be less than about 10% by weight of the composition. In some embodiments, the amount of these optional components is less than about 5% by weight of the composition.

The composition can comprise a reheat additive. Reheat additives are commonly used in the manufacture of polyester polymer compositions used to make stretch blow molded bottles because the preforms made from the composition must be reheated prior to entering the mold for stretch blowing into a bottle. Any conventional reheat additive can be used, such as various forms of black particles, e.g., carbon black, activated carbon, black iron oxide, glassy carbon, silicon carbide, gray particles such as antimony, and other reheat additives such as silicas, red iron oxide, and the like.

The composition can also comprise an impact modifier. Examples of typical impact modifiers useful in the composition include ethylene/acrylate/glycidyl terpolymers and ethylene/acrylate copolymers in which the acrylate is a methyl or ethyl acrylate or methyl or ethyl methacrylate or the corresponding butyl acrylates, styrene based block copolymers, and various acrylic core/shell type impact modifiers. The impact modifiers can be used in conventional amounts from about 0.1 to about 25 weight percent of the overall composition and, in some aspects, in amounts from about 0.1 to about 10 weight percent of the composition.

In many applications, not only are the packaging contents sensitive to the ingress of oxygen, but the contents may also be affected by UV light. Fruit juices and pharmaceuticals are two examples of such contents. Accordingly, in some aspects, it is desirable to incorporate into the composition a UV absorbing compound in an amount effective to protect the packaged contents.

The composition or an article made therefrom preferably has an Oxygen Transmission Rate (OTR) of less than about 0.1 (units of cc/pkg/day or 1-5 cc-mm/m$^2$-day-atm) under standard conditions. In a further aspect, the OTR can be less than 0.03, less than 0.01, less than 0.005, or less than 0.001. The OTR is a measure of how well the amide compound functions at scavenging oxygen that permeates the composition or article.

When OTR is expressed for a given composition or article, the units "cc/package/day" ("cc/pkg/day") are typically employed. The term package refers to a bather between an atmosphere of relatively lower oxygen content and an atmosphere of relatively higher oxygen content. Typical barriers (e.g., packages) include bottles, thermoformed containers, and films (e.g., shrink wrap).

Oxygen Transmission Rate (oxygen permeation) can be measured, for example, as described in U.S. Pat. No. 5,021,515. A material of area A can be exposed to a partial pressure p of oxygen on the one side and to an essentially zero partial pressure of oxygen on the other side. The quantity of oxygen emerging on the latter side is measured and expressed as a volume rate dV/dt, the volume being converted to some standard condition of temperature and pressure. After a certain time of exposure (usually a period of a few days) dV/dt is generally found to stabilize, and a $P_W$ value can be calculated from equation below.

$$dV/dt = P_W A p \tag{1}$$

$P_W$ refers to the permeance of the wall. (Analogy with magnetic permeance and electrical conductance would suggest that $P_W$ should be described as "permeance per unit area", but we are following the nomenclature in Encyclopaedia of Polymer Science and Technology, Vol. 2, Wiley Interscience, 1985, page 178.) The standard conditions for expressing dV/dt are 0° C. and 1 atm (1 atm=101 325 Nm$^{-2}$). If the thickness of the area of wall is substantially constant over the area A with value T and the wall is uniform through the thickness (i.e., the wall is not a laminated or coated one) then the permeability of the material in the direction normal to the wall is calculated from the equation below.

$$dV/dt = P_M A p / T \tag{2}$$

For non-scavenging materials, $P_W$ and $P_M$ are to a reasonable approximation independent of t and p, and $P_M$ of T although they are often appreciably dependent on other conditions of the measurement such as the humidity of the atmosphere on the oxygen-rich side and the temperature of the measurement.

For oxygen-scavenging walls, $P_W$ and $P_M$ are functions of t because the concentrations and activity of scavenger vary with time (particularly as the scavenger is consumed). This typically does not prevent measurement of $P_W$ and $P_M$ reasonably accurately as a function of time, because the changes in dV/dt are relatively gradual once the normal initial equilibration period of a few days is over. After a few days' exposure to the measurement conditions, however, a non-scavenging material typically achieves a steady state in which dV/dt is equal to the rate of oxygen ingress to the wall, while a scavenging material achieves an (almost) steady state in which dV/dt is considerably less than the rate of oxygen ingress to the material. This being the case, it is likely that $P_W$ calculated from (1) is a function of p as well as of t and that $P_M$ in (2) is a function of p and T as well as of t. $P_W$ and $P_M$ for scavenging materials are, strictly speaking, not true permeances and permeabilities at all (since permeation and scavenging are occurring simultaneously) but, rather, apparent ones.

Values of $P_W$ and $P_M$ (except where stated otherwise) are to be understood to refer to conditions in which p=0.21 atm, the relative humidity on the oxygen-rich side of the wall is 50%, the temperature is 23° C. and (in the case of $P_M$ values) the thickness of the material of about 0.45 mm Conditions close to the first three of these, at least, are conventional in the packaging industry.

For example, OTR can be measured for bottles, for example, by controlling the atmosphere on both sides of a sample of bottles and measuring the rate of oxygen permeation over time. Typically, the bottles are mounted on a plate such that there are two ports for gas inlet and outlet. The interior of the bottles is separated from the exterior by an air tight seal. After sealing, the interior of the bottle is flushed with $N_2$ gas (or $N_2+H_2$ mixture) to remove any oxygen present before mounting on plate. The bottle is then placed in a controlled environmental chamber (maintained at 23° C. and 50% RH) such that the exterior of the bottle is at standard atmosphere with ~21% oxygen. The interior of the bottle is continuously flushed with $N_2$ (or $N_2+H_2$) at a known gas flow rate. The outlet of the flushed gases contains oxygen permeating through the bottle wall. This flushed gas from the bottle interior is passed over a sensor that is calibrated to measure oxygen content of the flushed gas. Such measurements of oxygen content are made continuously over time until a steady state is reached. This steady state value is typically reported as Oxygen Transmission Rate (OTR) for that bottle in the units of cc/package/day. A preferred OTR for PET bottles is less than 0.1 cc/package/day; more preferred is less than 0.01 cc/package/day; most preferred for PET bottles is less than 0.001 cc/package/day over the shelf life of the packaged product.

In one aspect, a disclosed composition has an OTR of less than that of an otherwise identical composition in the absence of the amide compound and the transition metal. In further aspects, a disclosed composition has an OTR of less than about 75%, less than about 50%, less than about 25%, less than about 20%, less than about 10%, less than about 5%, or less than about 1% of an otherwise identical composition in the absence of the amide compound and the transition metal.

For example, measurements of oxygen permeation can be made by methods described, for example, in U.S. Pat. No. 5,639,815, which is incorporated herein by this reference for its teachings of oxygen permeability tests. Oxygen permeability tests are also discusses din U.S. Pat. Nos. 5,021,515, 5,034,252, 5,049,624, 5,159,005, 5,239,016, 5,639,815, 5,955,527, and U.S. Application Publication No. 2006/0180790, each of which is incorporated herein by this reference for its teaching of oxygen permeability tests. Oxygen permeability tests can also be carried out according to the method disclosed in WO/2006/023583 at page 10.

Various methods exist for making the composition. In one aspect, the composition can be made by mixing the polymer (comprising the amide compound), and optionally the transition metal, and optionally a colorant. In some aspects, some or part of the transition metal may already be present in the polymer prior to mixing, for example if the transition metal is used as a catalyst for making the base polymer. Other optional ingredients can be added during this mixing process or added to the mixture after the aforementioned mixing or to an individual component prior to the aforementioned mixing step.

When melt processing is desired for the composition, the composition can also be made by adding each ingredient separately and mixing the ingredients just prior to melt processing the composition to form an article. In some embodiments, the mixing can be just prior to the melt process zone. In other embodiments, one or more ingredients can be premixed in a separate step prior to bringing all of the ingredients together.

In some aspects, the transition metal can be added neat or in a carrier (such as a liquid or wax) to an extruder or other device for making the article, or the metal can be present in a concentrate or carrier with the polymer. It is desirable that the addition of the transition metal does not substantially increase the intrinsic viscosity of the melt in the melt processing zone. Thus, transition metal or metals can be added in two or more stages, such as once during the melt phase for the production of the polymer and again once more to the melting zone for making the article.

The melt blend of the polymer and any other ingredients can also be prepared by adding the components at the throat of an injection molding machine that: (i) produces a preform that can be stretch blow molded into the shape of the container, (ii) produces a film that can be oriented into a packaging film, (iii) produces a sheet that can be thermoformed into a food tray, or (iv) produces an injection molded container. The mixing section of the extruder should be of a design to produce a homogeneous blend. Such process steps work well for forming carbonated soft drink, water or beer bottles, packaging films and thermoformed trays. The present invention can be employed in any of the conventional known processes for producing a polymeric container, film, tray, or other article that would benefit from oxygen scavenging.

Various articles can be prepared from the disclosed compositions. Thus, the articles prepared from the compositions will also have the composition present in the article. Suitable articles include vessels and films, such as flexible sheet films, flexible bags, pouches, semi-rigid and rigid containers such as bottles (e.g. PET bottles) or metal cans, or combinations thereof. Typical flexible films and bags include those used to package various food items and can be made up of one or a multiplicity of layers to form the overall film or bag-like packaging material. The composition of the present invention can be used in one, some or all of the layers of such packaging material.

Specific articles include preforms, containers and films for packaging of food, beverages, cosmetics, pharmaceuticals, and personal care products where a high oxygen barrier is needed. Examples of beverage containers are bottles for holding water and carbonated soft drinks, and the invention is particularly useful in bottle applications containing juices, sport drinks, beer or any other beverage where oxygen detrimentally affects the flavor, fragrance, performance (e.g., vitamin degradation), or color of the drink. The compositions are also particularly useful as a sheet for thermoforming into rigid packages and films for flexible structures. Rigid packages include food trays and lids. Examples of food tray applications include dual ovenable food trays, or cold storage food trays, both in the base container and in the lidding (whether a thermoformed lid or a film), where the freshness of the food contents can decay with the ingress of oxygen. The compositions can also be used in the manufacture of cosmetic containers and containers for pharmaceuticals or medical devices.

Other suitable articles include rigid or semi-rigid articles including plastic, such as those utilized for juices, soft drinks, as well as thermoformed trays or cup normally having thickness in the range of from 100 to 1000 micrometers. The walls of such articles can comprise single or multiple layers of materials. The article can also take the form of a bottle or can, or a crown, cap, crown or cap liner, plastisol or gasket. The composition of the present invention can be used as an integral layer or portion of, or as an external or internal coating or liner of, the formed semi-rigid or rigid packaging article. As a liner, the composition can be extruded as a film along with the rigid article itself, e.g., by coextrusion, extrusion coating, or an extrusion lamination process, so as to form the liner in situ during article production; or alternatively can be adhered by heat and/or pressure, by adhesive, or by any other suitable method.

When the compositions are used in a wall or as a layer of a wall, the permeability of the composition for oxygen is advantageously not more than about 3.0, or about 1.7, or about 0.7, or about 0.2, or about 0.03 cm$^3$-mm/(m$^2$-atm-day). In some aspects, the permeability of the composition is not more than about three-quarters of that in the absence of the amide compound. In some aspects, the permeability is not more than about one half, one-tenth in certain embodiments, one twenty-fifth in other embodiments, and not more than one-hundredth of that in the absence of the amide compound.

Although it can be preferable from the standpoint of packaging convenience and/or scavenging effectiveness to employ the present invention as an integral or discrete part of the packaging wall, the invention can also be used as a non-integral component of a packaging article such as, for example, a bottle cap liner, adhesive or non-adhesive sheet insert, sealant, sachet, fibrous mat insert or the like.

Besides articles applicable for packaging food and beverage, articles for packaging other oxygen-sensitive products can also benefit from the present invention. Such products would include pharmaceuticals, oxygen sensitive medical products, corrodible metals or products, electronic devices and the like.

In a further aspect, the composition can be used as a master batch for blending with a polymer or a polymer containing component. In such compositions, the concentration of the amide compound and the transition metal will be high enough to allow for the final blended product to have suitable amounts of these components. The master batch can also contain an amount of the base polymer with which the master batch is blended.

Oxygen permeability of an article can be maintained for a longer period of time by storing the article in a sealed container or under an inert atmosphere such as nitrogen prior to use with oxygen sensitive materials.

The articles can be made by various methods known in the art. Generally, the articles are prepared by melt processing methods (i.e., a melt of the composition). Such processes generally include injection molding, stretch blow molding, extrusion, thermoforming, extrusion blow molding, and (specifically for multilayer structures) coextrusion and lamination using adhesive tie layers. Orientation, e.g., by stretch blow molding, of the polymer can be used with phthalate polyesters because of the known mechanical advantages that result.

The melt processing zone for making the article can be operated under customary conditions effective for making the intended articles, such as preforms, bottles, trays, and other articles mentioned above. In one aspect, such conditions are effective to process the melt without substantially increasing the intrinsic viscosity of the melt and which are ineffective at promoting transesterification reactions. In some preferred aspects, suitable operating conditions effective to establish a physical blend of the base polymer, oxidizable organic component, and transition metal are temperatures in the melt processing zone within a range of about 250° C. to about 300° C. at a total cycle time of less than about 6 minutes, and typically without the application of vacuum and under a positive pressure ranging from about 0 psig (pound-force per square inch gauge) to about 900 psig. In some embodiments, the residence time of the melt on the screw can range from about 1 to about 4 minutes.

EXPERIMENTAL

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Example 1

80 grams of bis(2-hydroxyethyl) terephthalate (BHET) (0.3147 moles) and 0.0123 g Sb$_2$O$_3$ (132 ppm Antimony, Sb) were charged into a 250 ml 3-neck flask. The flask was equipped with a mechanical stirrer and Dean-Stark receiver was purged with nitrogen, stirred and heated to 260° C. The condensation polymerization was allowed for 1.5 hours and then was kept for another 1 hour under vacuum to remove the generated ethylene glycol. The system was then cooled down to 190° C. 6 grams of DCX-320 (half-amide) was dissolved in 50 ml DMSO and added to the flask. With reflux, the solvent—DMSO was continuously distilled out. Meanwhile, the formed ethylene glycol was also distilled off along with DMSO via the formation of an azeotrope. 4 hours after addition of DCX-320, some fresh DMSO was added into the system to dilute the polymer solution and then the polymer was precipitated into methanol. The unreacted DCX-320 and solvent DMSO were extracted by methanol under reflux. The extraction was repeated 3 times. The purified polymer was dried in vacuo at 100° C. overnight and 62 grams of dry polymer was obtained.

The resulting polymer was characterized using GPC (with polystyrene as standard). The number average molecular weight (Mn) was found to be 6300 daltons and weight average molecular weight was found to be 9300 daltons. The polydispersity index was calculated to be 1.48.

Elemental analysis of the resulting polymer showed Carbon % to be 61.1%, Hydrogen % to be 4.78% and Nitrogen % to be 0.51%. Since PET does not have any nitrogen atoms, the presence of nitrogen confirms the end-capping reaction with DCX-320. Since there are 2 nitrogen atoms in each DCX-320 molecule, it is possible to estimate the degree of end-capping in the synthesized polymer as follows:

$(X/6300)*100\%=0.51\%$ ($N$ content from elemental analysis)

The weight of nitrogen atoms in each DCX-320 end-capped PET molecule is $X=32.13$. Comparing to the fully double end-capped chain with nitrogen weight of 56, the actual DCX-320 end-cap degree is $(32.13/56)*100=57.4\%$.

The reaction scheme is shown below:

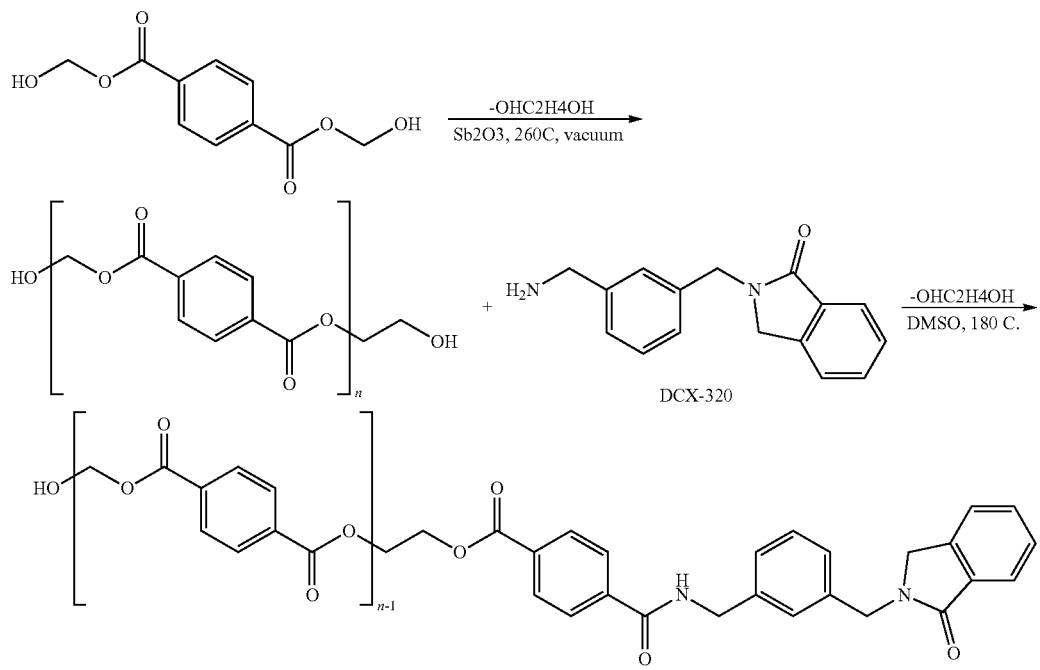

Example 2

The polymer synthesized in example 1 was used to make injection molded plaques on a BOY 22S. This polymer was vacuum dried at 110° C. for 24 hours to remove residual solvent. The PET resin used was Eastman's Vitiva™ resin. It was dried at 250° F. for ~15 hours then dried at 350° F. for 2 hours prior to use. Cobalt catalyst was added in a PET masterbatch form, such that the cobalt levels in the final plaque is 80 ppm. A batch was prepared of the hot, dry PET, PET based Cobalt Masterbatch and 1 wt % of the dried polymer synthesized in Example 1.

Plaques were injection molded on a BOY 22S injection molding machine. The Plaques formed from Example 2 were collected and tested for oxygen scavenging ability using Oxysense™. The plaques were ground to fine powder, placed in a sealed glass vial, with a photoluminescent window on the wall. The intensity of light reflected from the photoluminescent window is proportional to the oxygen content in the vial. The Oxysense™ data for the above polymer composition and a control composition comprised of Constar International's DC-100 is shown in FIG. 1. As seen from the data of FIG. 1, the polymer composition of Example 2 does scavenge oxygen when melt-blended with cobalt catalyst in a PET matrix.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A wall of a package comprising at least one layer, said layer comprising a composition, said composition comprising:

(a) a thermoplastic polymer comprising an allylic or benzylic amide compound covalently bonded as a repeating unit in the polymer chain, covalently bonded thereto as a side-chain pendant group, or covalently bonded thereto as an end group of the polymer, double bond; wherein each n is independently 1-5; wherein m is an integer from 0 to 5-n; wherein each X is independently selected from the group consisting of O, S, and NH; wherein each Y, each A, and each B are independently selected from the group consisting of N, $CR^1$, and $CR^2$; wherein D, E, and F are independently selected from the group consisting of CH, N, O, and S; wherein each $R^1$ and each $R^2$ is independently selected from the group consisting of carboxylic acid, amine, nitro, cyano, hydroxyl, H, alkyl, aryl, electron withdrawing groups, electron releasing groups, and a transition metal; and wherein L is a divalent linking group selected from C2-C12 aliphatic or cyclic ether, C2-C12 aliphatic or cyclic amide, C6 to C12 aromatic amide, C2-C12 aliphatic or cyclic amine, C6-C12 aromatic amine, C2-C12 aliphatic or cyclic ester and C6 to C12 aromatic ester;

(iv)

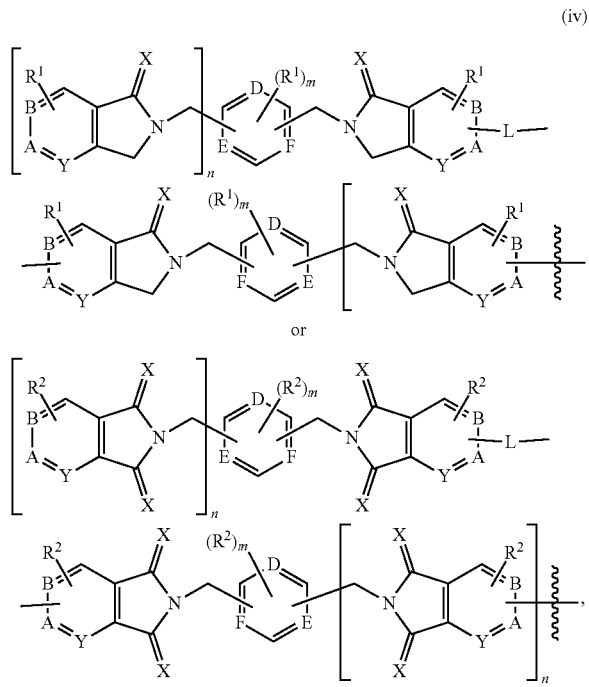

or wherein the symbol --- when used in conjunction with a bond line represents a single or a double bond; wherein each n is independently 0-5; wherein m is an integer from 0 to 5-n; wherein each X is independently selected from the group consisting of O, S, and NH; wherein each Y, each A, and each B are independently selected from the group consisting of N, $CR^1$, and $CR^2$; wherein D, E, and F are independently selected from the group consisting of CH, N, O, and S; wherein each $R^1$ and each $R^2$ is independently selected from the group consisting of carboxylic acid, amine, nitro, cyano, hydroxyl, H, alkyl, aryl, electron withdrawing groups, electron releasing groups, and a transition metal; and wherein L is a divalent linking group selected from C2-C12 aliphatic or cyclic ether, C2-C12 aliphatic or cyclic amide, C6 to C12 aromatic amide, C2-C12 aliphatic or cyclic amine, C6-C12 aromatic amine, C2-C12 aliphatic or cyclic ester and C6 to C12 aromatic ester; or (v)

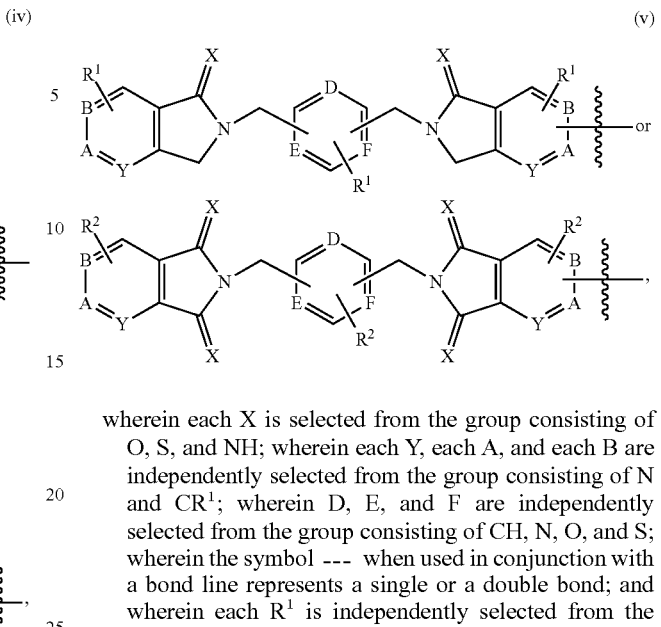

wherein each X is selected from the group consisting of O, S, and NH; wherein each Y, each A, and each B are independently selected from the group consisting of N and $CR^1$; wherein D, E, and F are independently selected from the group consisting of CH, N, O, and S; wherein the symbol --- when used in conjunction with a bond line represents a single or a double bond; and wherein each $R^1$ is independently selected from the group consisting of H, alkyl, aryl, electron withdrawing groups, and electron releasing groups; and (b) a transition metal in a positive oxidation state, the metal present in an amount of from about 10 ppm to about 400 ppm.

2. The wall of claim 1, wherein the amide compound is present in the composition in an amount of from 0.1 to about 10 weight percent.

3. The wall of claim 1, wherein the amide compound is present in the composition in an amount of from 1 to about 3 weight percent.

4. The wall of claim 1, wherein the amide compound is:

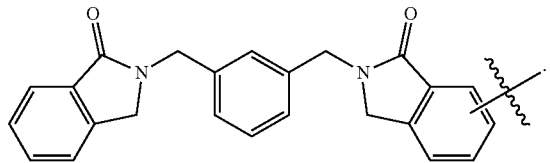

* * * * *